(12) United States Patent
Kumazawa et al.

(10) Patent No.: US 7,624,634 B2
(45) Date of Patent: Dec. 1, 2009

(54) ENVIRONMENTAL-STATE DETERMINATION APPARATUS

(75) Inventors: Shinji Kumazawa, Aichi (JP); Masayuki Motomura, Aichi (JP)

(73) Assignee: NGK Spark Plug Co., Ltd., Aichi-Ken (JP)

( * ) Notice: Subject to any disclaimer, the term of this patent is extended or adjusted under 35 U.S.C. 154(b) by 69 days.

(21) Appl. No.: 11/857,694

(22) Filed: Sep. 19, 2007

(65) Prior Publication Data
US 2008/0092647 A1 Apr. 24, 2008

(30) Foreign Application Priority Data
Oct. 18, 2006 (JP) ............................ 2006-284038
Aug. 6, 2007 (JP) ............................ 2007-204745

(51) Int. Cl.
*G01F 23/26* (2006.01)
(52) U.S. Cl. .................................. 73/304 C; 73/290 R
(58) Field of Classification Search .............. 73/304 C, 73/290 R
See application file for complete search history.

(56) References Cited

U.S. PATENT DOCUMENTS 4,716,536 A * 12/1987 Blanchard .................. 702/100

7,114,391 B2 * 10/2006 Sasaki et al. .............. 73/304 C

FOREIGN PATENT DOCUMENTS

JP 2004-219159 8/2004

* cited by examiner

*Primary Examiner*—Hezron Williams
*Assistant Examiner*—Rodney T Frank
(74) *Attorney, Agent, or Firm*—Kusner & Jaffe (57) ABSTRACT

An environmental-state determination apparatus includes a pair of detection electrodes which provide therebetween a capacitance which changes in accordance with a state of a surrounding environment, for example, the level of a liquid. A detection signal is input to a signal passage connected to the detection electrodes. A first capacitance parameter representing the capacitance of the detection electrodes is detected on the basis of a signal output from the signal passage in the connected state. The detection signal is input to the signal passage from which the detection electrodes are disconnected. A second capacitance parameter representing the capacitance of the signal passage is detected on the basis of a signal output from the signal passage in the disconnected state. The first capacitance parameter is corrected by subtracting therefrom the second capacitance parameter. The state of the surrounding environment is determined on the basis of the corrected first capacitance parameter.

4 Claims, 7 Drawing Sheets

ENVIRONMENTAL-STATE DETERMINATION APPARATUS

BACKGROUND OF THE INVENTION

1. Field of the Invention

The present invention relates to an environmental-state determination apparatus for determining the state of an environment surrounding a pair of detection electrodes, using a capacitance between the pair of detection electrodes.

2. Description of the Related Art

Currently, there exists an apparatus for determining the level of liquid that makes use of a phenomenon in which a capacitance between a pair of detection electrodes changes in accordance with the amount of the liquid present around the electrodes (see, for example, Japanese Patent Application Laid-Open (kokai) No. 2004-219159).

However, the above-described apparatus is easily influenced by stray capacitances present in the apparatus (specifically, stray capacitances present at signal passes electrically connected to the pair of detection electrodes), because the apparatus is configured so as to determine the state of a surrounding environment (i.e., the liquid level) from the capacitance between the detection electrodes. Therefore, in some cases, the apparatus fails to accurately determine the liquid level because of the influence of the stray capacitances.

In particular, in a case where the pair of detection electrodes are disposed on a common plane, since the capacitance between the detection electrodes itself is small, the influence of the stray capacitances cannot be ignored, and the liquid level cannot be properly determined.

SUMMARY OF THE INVENTION

In view of the foregoing, an object of the present invention is to provide an environmental-state determination apparatus which can suppress the influence of stray capacitances present in the apparatus so as to properly determine, from a capacitance between a pair of detection electrodes, the state of an environment surrounding the detection electrodes.

In order to achieve the above-described object, the present invention provides an environmental-state determination apparatus comprising a pair of detection electrodes which provide therebetween a capacitance which changes in accordance with a state of a surrounding environment; first input means for inputting a detection signal to a signal passage connected to the detection electrodes; first capacitance detection means for detecting a capacitance parameter representing the capacitance of the detection electrodes on the basis of a signal output from the signal passage to which the detection signal is input by the first input means; and environment determination means for determining the state of the surrounding environment of the detection electrodes on the basis of the capacitance parameter detected by the first capacitance detection means.

The environmental-state determination apparatus further comprises disconnection means for disconnecting the detection electrodes from the signal passage; second input means for inputting the detection signal to the signal passage from which the detection electrodes are disconnected by the disconnection means; second capacitance detection means for detecting a capacitance parameter representing the capacitance of the signal passage on the basis of a signal output from the signal passage to which the detection signal is input by the second input means; and parameter correction means for correcting the capacitance parameter detected by the first capacitance detection means by subtracting therefrom the capacitance parameter detected by the second capacitance detection means, wherein the environment determination means determines the state of the surrounding environment on the basis of the capacitance parameter corrected by the parameter correction means.

In the environmental-state determination apparatus configured as described above, the state of the surrounding environment is determined on the basis of a capacitance parameter obtained by correcting the capacitance parameter in a state where the detection electrodes are connected to the signal passage by reference to the capacitance parameter in a state where the detection electrodes are disconnected from the signal passage.

Some stray capacitance is present on the signal passage irrespective of whether or not the detection electrodes are connected thereto. In this case, the capacitance parameter detected in a state where the detection electrodes are connected to the signal passage is equal to the sum of the capacitance of the detection electrodes and the stray capacitance of the signal passage. Meanwhile, the capacitance parameter detected in a state where the detection electrodes are disconnected from the signal passage is equal to the stray capacitance of the signal passage.

Therefore, if the capacitance parameter in the state where the detection electrodes are connected to the signal passage is corrected by the capacitance parameter in the state where the detection electrodes are disconnected from the signal passage, the capacitance parameter becomes one in which the influence of the stray capacitance is suppressed.

The state of the surrounding environment is determined from the capacitance parameter having the influence of the stray capacitance suppressed, whereby the state of the surrounding environment can be properly determined, while the influence of the stray capacitance is suppressed.

The capacitance parameter detected by the first capacitance detection means is a parameter representing the sum of the capacitance of the detection electrodes and the capacitance (stray capacitance) of the signal passage. The capacitance parameter detected by the second capacitance detection means is a parameter representing the capacitance (stray capacitance) of the signal passage. Each of these capacitance parameters may be a voltage value, a current value, or a digital value converted from these values. However, the capacitance parameters detected by the first and second capacitance detection means are of the same type, because both the capacitance parameters are subjected to subtraction, as will be described below.

In the environmental-state determination apparatus, in order to eliminate the influence of the stay capacitance on the capacitance parameter in the state where the detection electrodes are connected to the signal passage, the capacitance parameter detected by the second capacitance detection means is subtracted from the capacitance parameter detected by the first capacitance detection means, whereby correction of the first mentioned capacitance parameter is performed.

In this configuration, when the first and second capacitance detection means are each configured to detect capacitance itself as the capacitance parameter, the capacitance parameters detected by the first and second capacitance detection means assume values corresponding to the capacitances of the detection electrodes and the signal passage.

In this case, the capacitance parameter detected by the first capacitance detection means represents the sum of the capacitance of the detection electrodes and the stray capacitance present on the signal passage, and the capacitance parameter detected by the second capacitance detection means represents the stray capacitance present on the signal passage.

Therefore, the influence of the stay capacitance can be eliminated by means of subtracting the capacitance parameter detected by the second capacitance detection means from the capacitance parameter detected by the first capacitance detection means.

The state of the surrounding environment determined by the above-described environment determination means may be the state of a substance (liquid or powder) present around the pair of detection electrodes in the case where the detection electrodes are disposed such that the capacitance thereof or the level of a signal passing therethrough changes in accordance with the substance present around the pair of detection electrodes.

In such a case, for example, the environment determination means is configured to determine the state of the substance present around the pair of detection electrodes (that is, surrounding environment) from the capacitance parameter corrected by the parameter correction means. By virtue of this configuration, the state of the substance present around the pair of detection electrodes (surrounding environment) can be accurately determined, while the influence of the stray capacitance present on the signal passage connected to the detection electrodes is mitigated.

The present invention is particularly useful in the case where the pair of detection electrodes of the environmental-state determination apparatus are plate-shaped electrodes which are disposed on a common plane such that a capacitance is produced between the electrodes in accordance with the state of the surrounding environment.

When the detection electrodes are paired plate-shaped electrodes disposed on a common plane, the capacitance produced between the electrodes tends to be small as compared with paired electrodes disposed such that their main faces face each other. Therefore, the influence of the stray capacitance of the signal passage connected to the detection electrodes is larger than that in the case where paired electrodes are disposed such that their main faces face each other. Accordingly, in the present invention, the influence of the stay capacitance is eliminated by means of subtracting the capacitance parameter detected by the second capacitance detection means from the capacitance parameter detected by the first capacitance detection means. Thus, the state of the environment surrounding the detection electrodes can be determined more accurately.

Incidentally, when capacitance parameter correction is performed by the parameter correction means, the following procedure may be employed. Every time detection of the capacitance parameter representing the capacitance of the detection electrodes is performed by the first capacitance detection means a predetermined number of times, detection of the capacitance parameter representing the capacitance of the signal passage by the second capacitance detection means is performed, and the capacitance parameter detected by the first capacitance detection means is corrected by use of the same capacitance parameter until the detection of the capacitance parameter is again performed by the second capacitance detection means. However, the stray capacitance of the signal passage also changes due to a change in the temperature around the apparatus. Therefore, in order to accurately determine the state of the surrounding environment preferably, the detection of the capacitance parameter by the first capacitance detection means and the detection of the capacitance parameter by the second capacitance detection means are alternatively repeated, and correction is performed between the latest capacitance parameters.

In the environmental-state determination apparatus, preferably, the disconnection means is configured to connect the detection electrodes to the signal passage and disconnect the detection electrodes from the signal passage in order to successively repeat the detection of the capacitance parameter representing the capacitance of the detection electrodes by the first capacitance detection means and the detection of the capacitance parameter representing the capacitance of the signal passage by the second capacitance detection means; and the parameter correction means performs the capacitance parameter correction by subtracting the latest capacitance parameter detected by the second capacitance detection means from the latest capacitance parameter detected by the first capacitance detection means.

By virtue of this configuration, the capacitance parameter detected by the first capacitance detection means can be corrected by use of the latest capacitance parameter detected by the second capacitance detection means. Therefore, even when the temperature around the apparatus changes, the state of the environment surrounding the detection electrodes can be determined accurately.

A specific example of the state of the environment surrounding the detection electrodes may be the level of a liquid. Specifically, in a case where the pair of detection electrodes are partially immersed in a liquid such that the level of a signal passing through the detection electrodes changes in accordance with the ratio of an immersed portion of the electrodes, the level of the liquid can be determined, as the state of the surrounding environment, from the ratio of a portion of the electrodes immersed in the liquid.

In this case, the environment determination means is configured to detect the ratio of a portion of the detection electrodes immersed in the liquid from the capacitance parameter corrected by the parameter correction means, and determines, as the state of the surrounding environment the level of the liquid from the detected ratio.

By virtue of this configuration, the level of the liquid into which the detection electrodes are immersed can be determined accurately.

Further, all the means of the environmental-state determination apparatus, except for the hardware configuration, can be realized by a program which causes a computer system to perform various processing steps which function as the means.

The computer system controlled by this program can constitute a portion of the environmental-state determination apparatus.

Notably, such a program is a series of ordered instructions suitable for processing by a computer system, and is provided to the environmental-state determination apparatus or a user thereof via various recording medium or a communication network.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

An embodiment of the present invention will now be described with reference to the accompanying drawings.

(1) Overall Configuration

A liquid level detection apparatus 1, which detects the level of a liquid, includes a level sensor 10 for detecting the value of a parameter regarding the liquid level by use of a plurality of electrodes; and a detection circuit 20 for detecting the liquid level on the basis of a signal output from the level sensor 10 and representing the value of the parameter (detection result).

In the present embodiment the liquid level detection apparatus 1 detects the level of oil stored in an oil tank of an internal combustion engine.

(1-1) Level Sensor 10

Figure 2:
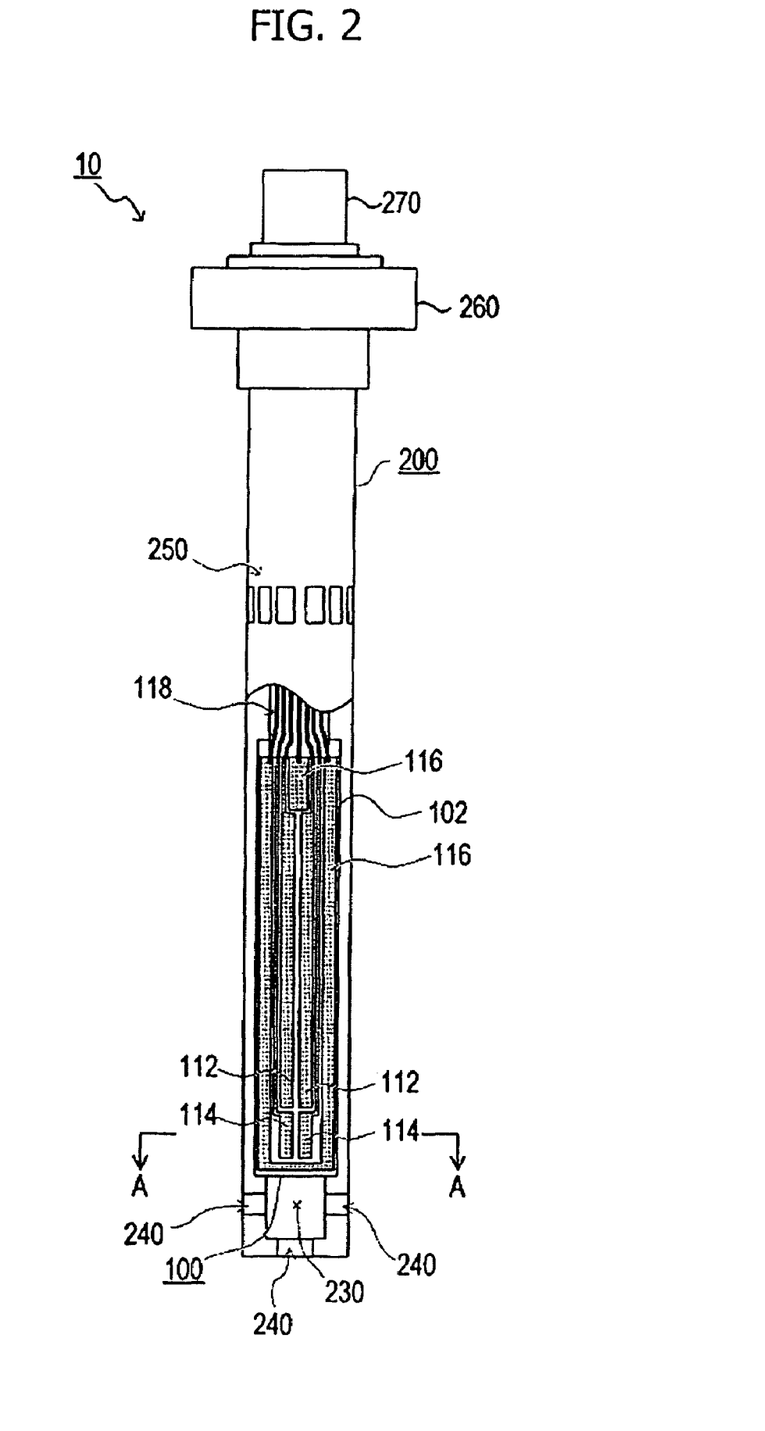
FIG. 2 is a partially sectioned view of a level sensor.

As shown in FIG. 2, the level sensor 10 of the liquid level detection apparatus 1 includes a level detection element 100 having electrodes for parameter detection, and a casing 200 for accommodating the level detection element 100, The level detection element 100 includes a film-shaped film member 102 extending vertically (in a top-bottom direction in FIG. 2), a detection electrode 112, a reference electrode 114, a ground electrode 116, etc. The detection electrode 112, the reference electrode 114, and the ground electrode 116 are formed within the film member 102, which is comprised of two film layers; that is, these electrodes 112, 114, and 116 are sandwiched between the two film layers so that they are sealed liquid-tight within the film member 102.

The detection electrode 112 is comprised of two electrodes formed on a common surface of the film member 102 such that they extend in parallel along the longitudinal direction of the film member 102.

The detection electrode 112 thus formed functions as a capacitor whose inter-electrode capacitance changes in accordance with the dielectric constant of a substance present around the detection electrode 112. Since the two electrodes are formed to extend in parallel along the longitudinal direction of the film member 102, the capacitance between these electrodes (hereinafter referred to as the "capacitance of the detection electrode 112") changes in accordance with the ratio of a portion immersed in the liquid (hereinafter referred to as the "immersion ratio").

Since a correlation exists between the capacitance of the detection electrode 112 and the immersion ratio of the detection electrode 112, the immersion ratio of the detection electrode 112 can be determined from the capacitance of the detection electrode 112, whereby the level of the liquid in which the detection electrode is immersed can be determined from the immersion ratio.

Like the detection electrode 112, the reference electrode 114 is comprised of two electrodes which extend in parallel along the longitudinal direction of the film member 102. However, in order to ensure that the entire electrode is always immersed in the liquid, the reference electrode 114 is formed at a front end (lower end in FIG. 2) of the film member 102.

Like the detection electrode 112, the reference electrode 114 thus formed functions as a capacitor whose inter-electrode capacitance changes in accordance with the dielectric constant of a substance present around the reference electrode 114. Since the reference electrode 114 is always immersed in the liquid, the capacitance between the two electrodes (the capacitance of the reference electrode 114) changes in accordance with the dielectric constant of the liquid in which the reference electrode is immersed.

As described above, the capacitance of the reference electrode 114 changes in accordance with the dielectric constant of the liquid. Therefore, if the dielectric constant changes because of, for example, alteration of properties of the liquid due to deterioration, or addition of a different type of liquid (oil), the capacitance of the reference electrode 114 reflects the present or changed dielectric constant of the liquid. In view of the above, as will be described later, the present embodiment is configured to determine the liquid level from the capacitance detected by the reference electrode 114 and the capacitance detected by the detection electrode 112, while eliminating influence of a change in the dielectric constant of the liquid.

The ground electrode 116 is comprised of an electrode formed to extend along the longitudinal direction of the film member 102, and an electrode which is formed between the detection electrode 112 and a rear end (upper end in FIG. 2) of the film member 102. This ground electrode 116 is electrically connected to a ground line (ground potential) so as to prevent the stray capacitances of lead portions, etc., around the ground electrode 116 from adversely affecting the measurement of the capacitances of the detection electrode 112 and the reference electrode 114.

The above-described electrodes 112, 114, and 116 are electrically connected to an external cable via lead wires 118 and a connector portion 270, which will be described later.

Figure 3:
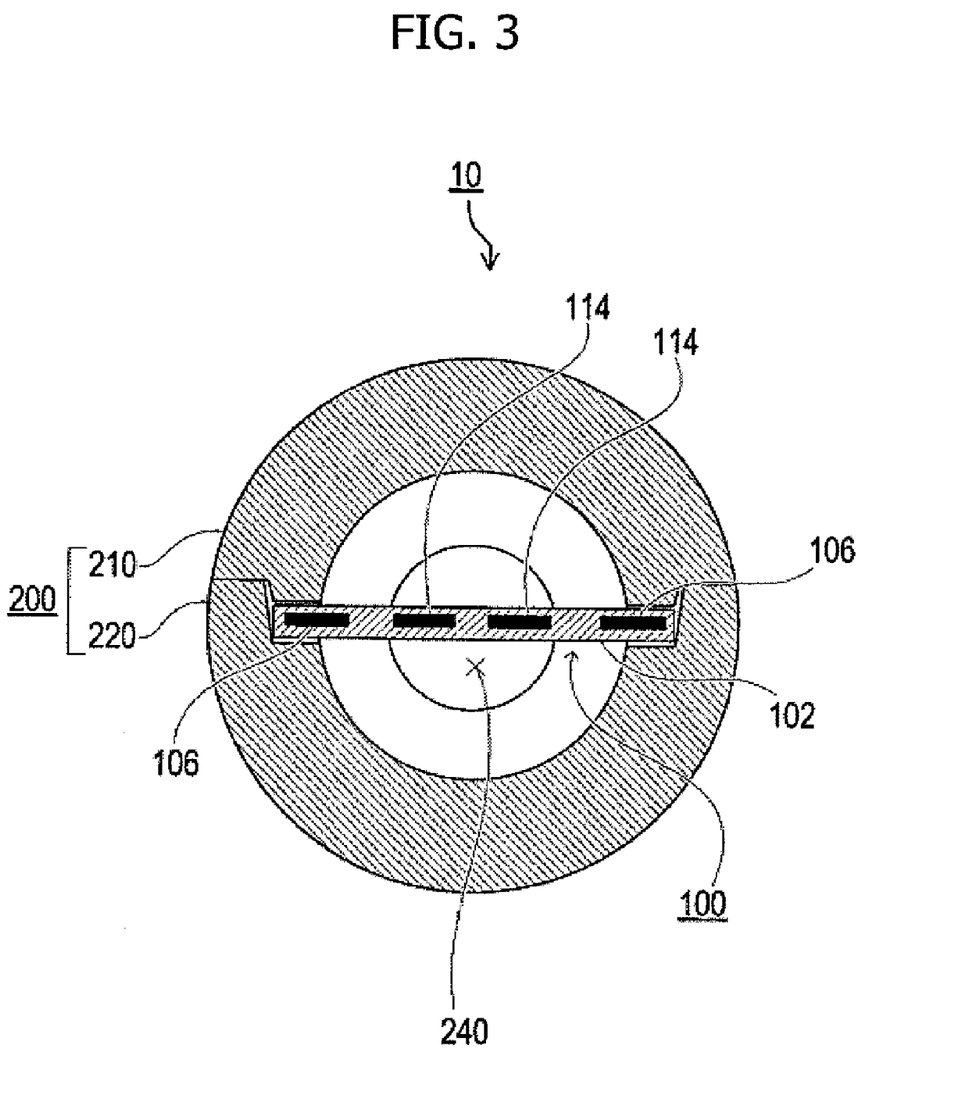
FIG. 3 is a cross-sectional view of the level sensor taken along line A-A of FIG. 2.

As shown in FIG. 3, which is a cross-sectional view of the level sensor 10 taken along line A-A of FIG. 2, the casing 200 is comprised of semi-columnar members 210 and 220, which are assembled together so as to form a cylindrical tube extending in the longitudinal direction of the level sensor 10. The level detection element 100 is accommodated within an internal space 230 formed in the cylindrical tube.

The casing 200 has a plurality of through-holes 240 and 250 for connecting the exterior of the casing and the internal space 230. The through-holes 240 and 250 are formed at a front end portion (lower end in FIG. 2) and a central portion, respectively, of the casing with respect to the longitudinal direction thereof. The through-holes 240 and 250 enable the liquid to flow between the exterior of the casing and the internal space 230.

The casing 200 has a flange portion 260 formed at its rear end (upper end in FIG. 2) thereof, and the connector portion 270 projecting from the rear end.

The flange portion 260 comes into engagement with an outer surface of an oil tank when the level sensor 10 is attached to the oil tank, and positions the level sensor 10 (casing 200) in relation to the oil tank. The connector portion 270, which is connected to the lead wires 118, establishes electrical connection between the detection circuit 20 and the level sensor 10.

When the level sensor 10 configured as described above is attached to an oil tank whose oil level is to be measured, an amount of oil corresponding to the liquid level enters the internal space 230 of the casing 200, so that the level detection element 100 is partially immersed in the oil. The ratio of the immersed portion corresponds to the oil level. Thus, the capacitance of the detection electrode 112 assumes a value corresponding to the oil level, and the capacitance of the reference electrode 114 assumes a value corresponding to the dielectric constant of the oil.

(1-2) Detection Circuit 20

Figure 1:
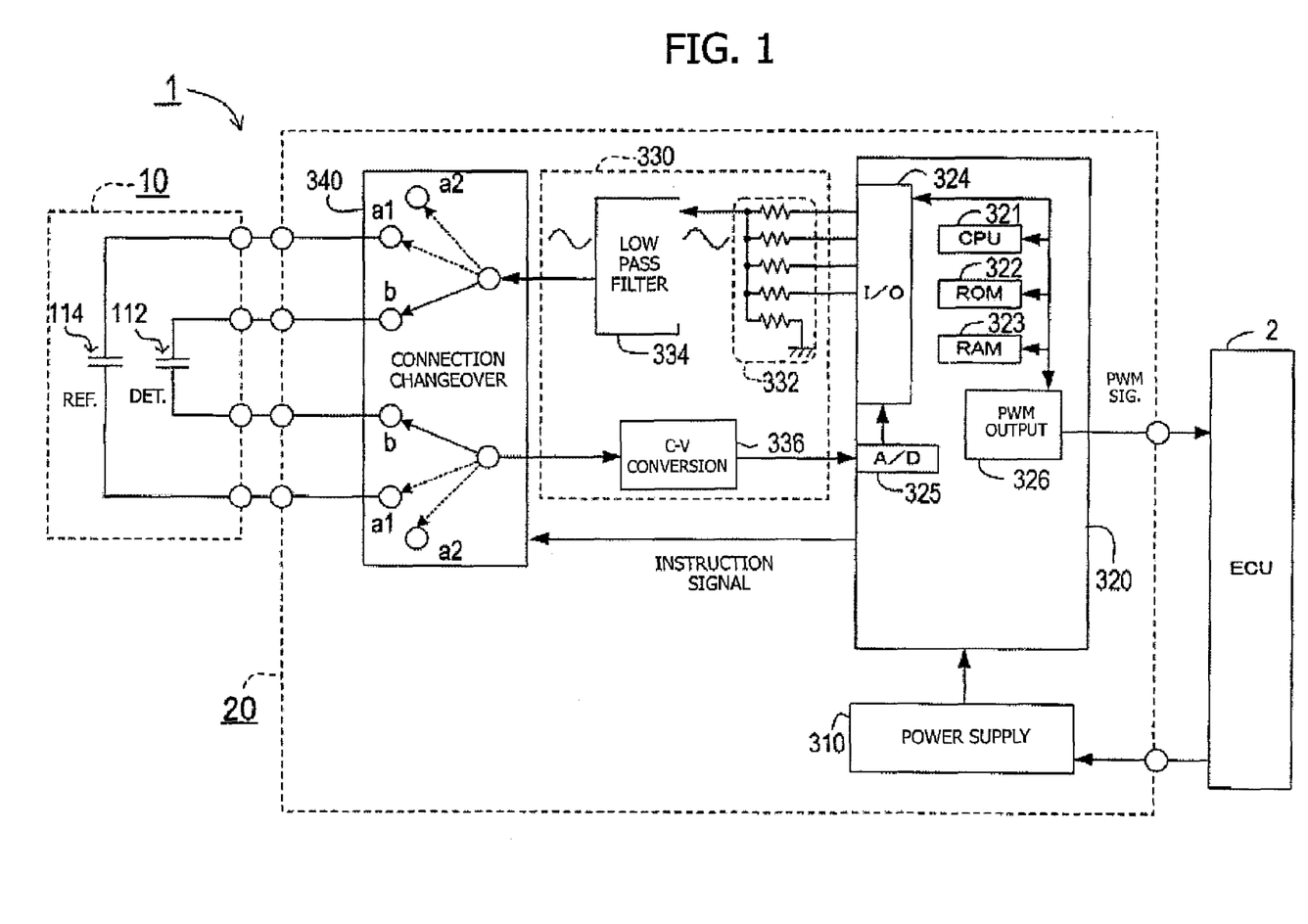
FIG. 1 is a block diagram showing the entire configuration of a liquid-level detection apparatus.

As shown in FIG. 1, the detection circuit 20 of the above-described liquid-level detection apparatus 1 includes a power supply circuit 310, a microcomputer 320, a signal output/acquisition circuit 330, and a connection changeover circuit 340.

The power supply circuit 310 receives electrical power from an electronic control unit (ECU) 2 provided on a vehicle, and supplies the electrical power to various sections of the detection circuit 20.

The microcomputer 320 is a well-known computer system including a CPU 321, ROM 322, RAM 323, an input/output portion (I/O) 324, etc. In addition to these components, the microcomputer 320 includes an A/D conversion port 325, and a PWM output section 326.

The CPU 321 executes level detection processing to be described later, in accordance with a program stored in the ROM 322, to thereby detect the liquid level on the basis of the detection result output from the level sensor 10 and output the detected liquid level to the electronic control unit 2.

The signal output/acquisition circuit 330 includes a voltage-division circuit 332, a low-pass filter 334, and a current-voltage conversion circuit 336.

The voltage-division circuit 332 is comprised of a plurality of resistor elements connected between different ports of the microcomputer 320 and the low-pass filter 334. The voltage-division circuit 332 outputs to the low-pass filter 334 a signal having a level which is changed stepwise through changing a combination of resistor elements receiving the power supply voltage from the microcomputer 320, in synchronism with the timing of the change.

The low-pass filter 334 removes high-frequency components from the stepwise waveform output from the voltage-division circuit 332; i.e., makes gentle the stepwise, abrupt changes of the signal level in accordance with a predetermined time constant, and outputs the signal to the connection changeover circuit 340.

The current-voltage conversion circuit 336 is configured to convert a current waveform signal (signal representing change in current) output from the detection electrode 112 or the reference electrode 114 to a voltage waveform signal (signal representing change in voltage), and output the voltage waveform signal to the microcomputer 320.

The connection changeover circuit 340 includes internal switches which operate in accordance with instructions from the microcomputer 320. The switches are switched so as to selectively establish a state in which the low-pass filter 334 and the current-voltage conversion circuit 336 are connected to the detection electrode 112 (a state in which contacts b are selected), a state in which the low-pass filter 334 and the current-voltage conversion circuit 336 are connected to the reference electrode 114 (a state in which contacts a1 are selected), and a state in which the low-pass filter 334 and the current-voltage conversion circuit 336 are not connected to these electrodes (a state in which contacts a2 are selected).

(2) Processing by Microcomputer 320

Next, there will be described processing executed by the microcomputer 320 (specifically, the CPU 321).

(2-1) Liquid-Level Detection Processing

First, the steps of the liquid-level detection processing will be described with reference to FIG. 4. This liquid-level detection processing is repeatedly executed after the liquid-level detection apparatus 1 is started.

When this liquid-level detection processing is started, first, the RAM 323, the input/output port 324, various registers, etc. are initialized (s10).

Subsequently, disconnected-phase determination processing is performed (s20). As will be described in detail later, in this disconnected-phase determination processing, after the level sensor 10 is disconnected from the detection circuit 20, a detection signal is input to a signal passage extending to the level sensor 10 (a passage between the low-pass filter 334 and the connection changeover circuit 340; hereinafter simply referred to as a "signal passage"); and the signal level (its maximum value) of a passage signal, which is the detection signal having passed through the signal passage, is determined.

Next, reference-phase determination processing is performed (s30). As will be described in detail later, in this reference-phase determination processing, after the reference electrode 114 of the level sensor 10 is connected to the detection circuit 20, a detection signal is input to the reference electrode 114; and the signal level (its maximum value) of a passage signal, which is the detection signal having passed through the reference electrode 114, is determined.

Next, detection-phase determination processing is performed (s40). As will be described in detail later, in this detection-phase determination processing, after the detection electrode 112 of the level sensor 10 is connected to detection circuit 20, a detection signal is input to the detection electrode 112; and the signal level (its maximum value) of a passage signal, which is the detection signal having passed through the detection electrode 112, is determined.

In the present embodiment, the liquid-level detection processing is configured so as to repeat the disconnected-phase determination processing (s20), the reference-phase determination processing (s30), and the detection-phase determination processing (s40) in this sequence.

Next, the latest signal level determined in s30 and the latest signal level determined in s40 are corrected on the basis of the latest signal level determined in s20 (s44). Specifically, the signal level determined in s30 is corrected to a value obtained by subtracting a value representing the signal level determined in s20 from a value representing the signal level determined in s30. The signal level determined in s40 is corrected to a value obtained by subtracting a value representing the signal level determined in s20 from a value representing the signal level determined in s40.

Subsequently, the liquid level is determined on the basis of the two signal levels corrected in s44 (s50). Specifically, the capacitances of the reference electrode 114 and the detection electrode 112 are calculated from the respective signal levels corrected in s44, and the liquid level is calculated from the ratio between the capacitances in accordance with a known method.

In the present embodiment, the liquid level is calculated from the ratio between the capacitances. However, a value representing a liquid level and corresponding to the signal levels corrected in s44 may be determined by use of a mathematical formula and/or a data table.

Subsequently, a PWM signal having a duty ratio corresponding to the liquid level determined in s50 is output from the PWM output section 326 to the ECU 2 (s60). The processing then returns to s20.

In s60, an instruction which instructs generation and output of a PWM signal having a duty ratio corresponding to the liquid level determined in s50 is fed to the PWM output section 326. Upon receipt of this instruction, the PWM output section 326 outputs to the ECU 2 a PWM signal having such a duty ratio. Upon receipt of the PWM signal, the ECU 2 recognizes the liquid level from the duty ratio of the PWM signal.

(2-2) Disconnected-Phase Determination Processing

Subsequently, the steps of the disconnected-phase determination processing performed in s20 of FIG. 4 will be described with reference to FIG. 5.

In this disconnected-phase determination processing, first, the level sensor 10 is disconnected from the detection circuit 20 (s210). Specifically, an instruction signal which instructs switching of the connection is fed from the microcomputer 320 to the connection changeover circuit 340. Upon receipt of this instruction signal, the connection changeover circuit 340 switches the connection state of the low-pass filter 334 and the current-voltage conversion circuit 336 (hereinafter simply referred to as the "connection state") to an open state (the internal switches are switched to contacts a2 in FIG. 1) in which the low-pass filter 334 and the current-voltage conversion circuit 336 are connected to none of the electrodes. In this manner, the level sensor 10 is disconnected from the detection circuit 20.

Next, the signal output/acquisition circuit 330 generates a detection signal to be input to the signal passage (s220).

In s220, in order to sinusoidally change the level of the signal output from the voltage-division circuit 332 of the signal output/acquisition circuit 330, the microcomputer 320 repeatedly changes the combination of the resistor elements which supply signals in the voltage-division circuit 332, whereby a signal whose level changes sinusoidally is generated and output from the voltage-division circuit 332 as a detection signal.

The detection signal output from the voltage-division circuit 332 passes through the low-pass filter 334 of the signal output/acquisition circuit 330, so that the detection signal becomes a sinusoidal signal having no high-frequency components. The sinusoidal signal is then input to the connection changeover circuit 340.

The passage signal; i.e., the signal having passed through the signal passage, is fetched via the signal output/acquisition circuit 330, the A/D conversion portion 325, and the input/output port 324 (s230). The maximum value of the signal level (amplitude) of the fetched passage signal is determined (s240). Subsequently, the processing returns to the liquid-level detection processing (moves to s30 of FIG. 4), while the determined maximum value is set as a return value.

(2-3) Reference-Phase Determination Processing

Subsequently, the steps of the reference-phase determination processing performed in s30 of FIG. 4 will be described with reference to FIG. 6.

In this reference-phase determination processing, first, the reference electrode 114 of the level sensor 10 is connected to the detection circuit 20 (s310).

Specifically, in s310, an instruction signal which instructs switching of the connection is fed from the microcomputer 320 to the connection changeover circuit 340. Upon receipt of this instruction signal, the connection changeover circuit 340 switches the connection state to a state (the internal switches are switched to contacts a1 in FIG. 1) in which the low-pass filter 334 and the current-voltage conversion circuit 336 are connected to the reference electrode 114 of the level sensor 10. In this manner, the reference electrode 114 of the level sensor 10 is connected to the detection circuit 20.

Figure 5:
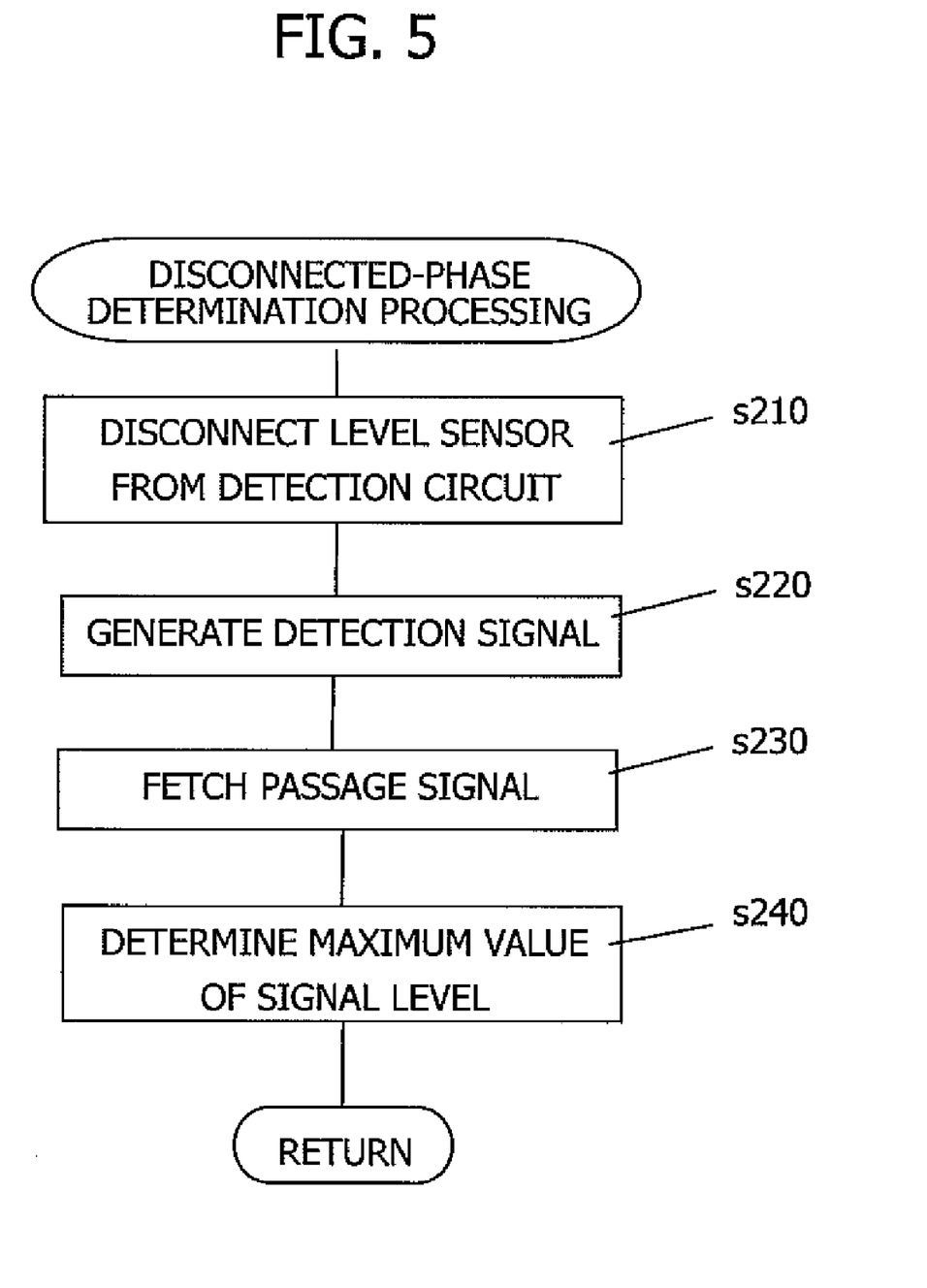
FIG. 5 is a flowchart showing disconnected-phase determination processing.

Next, as in s220 of FIG. 5, the signal output/acquisition circuit 330 generates a detection signal to be input to the signal passage (s320).

Subsequently, the passage signal; i.e., the signal having passed through the signal passage, is fetched via the signal output/acquisition circuit 330, the A/D conversion portion 325, and the input/output port 324 (s330). The maximum value of the signal level (amplitude) of the fetched passage signal is determined (s340). The processing then returns to the liquid-level detection processing (moves to s40 of FIG. 4), while the determined maximum value is set as a return value.

Since the maximum value of the signal level fetched in s330 is that of the signal having passed through the reference electrode 114, the maximum value is proportional to the capacitance of the reference electrode 114. As described above, the capacitance of the reference electrode 114 changes in accordance with the dielectric constant of the liquid. Therefore, the maximum value of the signal level determined in s340 can be said to represent a value corresponding to the dielectric constant of the liquid.

(2-4) Detection-Phase Determination Processing

Subsequently, the steps of the detection-phase determination processing performed in s40 of FIG. 4 will be described with reference to FIG. 7.

In this detection-phase determination processing, first, the detection electrode 112 of the level sensor 10 is connected to the detection circuit 20 (s410).

Specifically, an instruction signal which instructs switching of the connection is fed from the microcomputer 320 to the connection changeover circuit 340. Upon receipt of this instruction signal, the connection changeover circuit 340 switches the connection state to a state (the internal switches are switched to contacts b in FIG. 1) in which the low-pass filter 334 and the current-voltage conversion circuit 336 are connected to the detection electrode 112 of the level sensor 10. In this manner, the detection electrode 112 of the level sensor 10 is connected to the detection circuit 20.

Next, as in s220 of FIG. 5, the signal output/acquisition circuit 330 generates a detection signal to be input to the signal passage (s420).

Subsequently, the passage signal; i.e., the signal having passed through the signal passage, is fetched via the signal output/acquisition circuit 330, the A/D conversion portion 325, and the input/output port 324 (s430). The maximum value of the signal level (amplitude) of the fetched passage signal is determined (s440). The processing then returns to the liquid-level detection processing (moves to s50 of FIG. 4), while the determined maximum value is set as a return value.

Since the maximum value of the signal level fetched in s430 is that of the signal having passed through the detection electrode 112, the maximum value is proportional to the capacitance of the detection electrode 112. As described above, the capacitance of the detection electrode 112 changes in accordance with the immersion ratio of the detection electrode 112, which is the ratio of the immersed portion. Therefore, the maximum value of the signal level determined in s430 can be said to be a value corresponding to the immersion ratio of the detection electrode 112; i.e., a value from which the liquid level can be determined.

(3) Action and Effects

Figure 4:
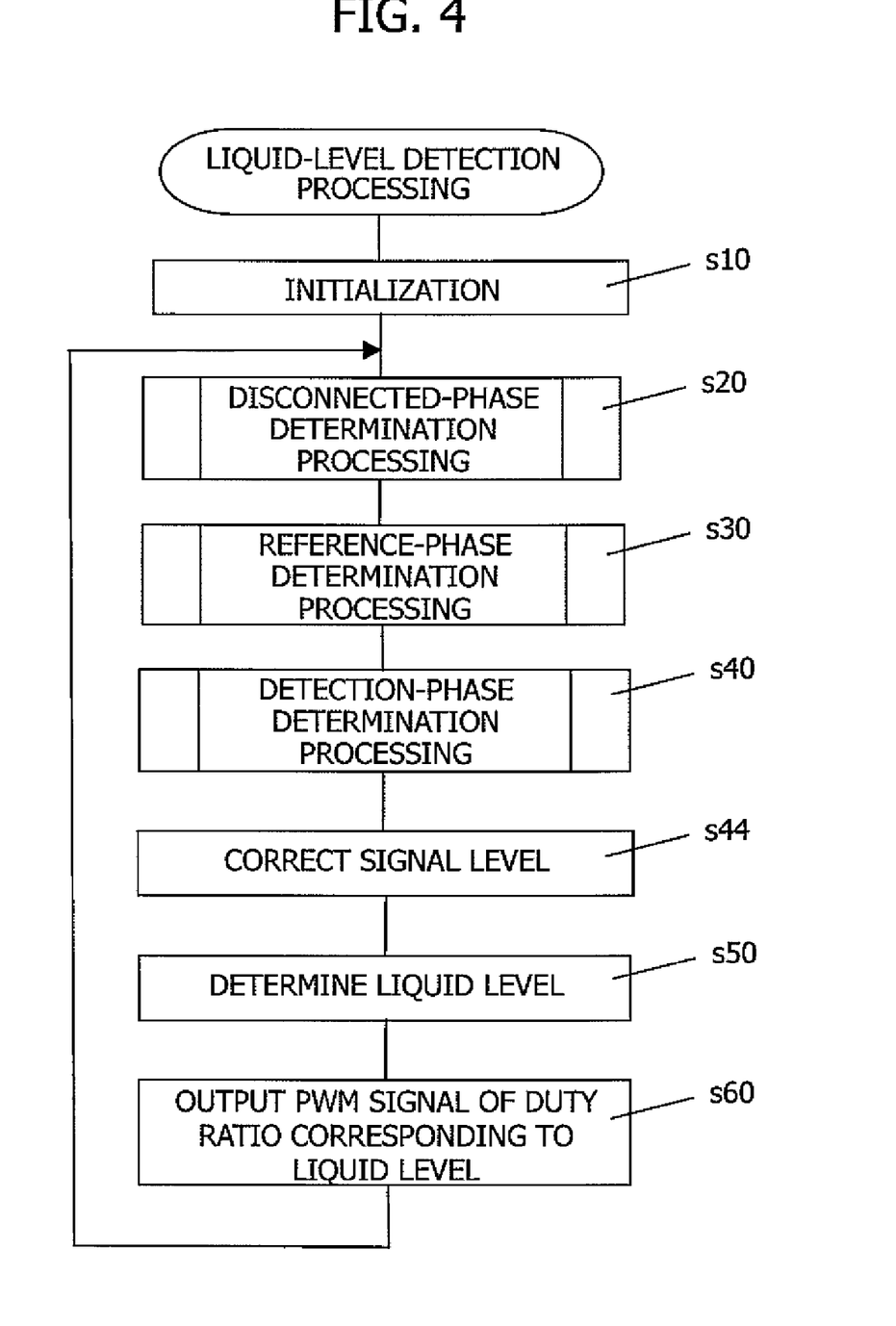
FIG. 4 is a flowchart showing liquid-level detection processing.

In the liquid-level detection apparatus 1 having the above-described configuration, the liquid level is determined on the basis of a signal level obtained by correcting the signal level of the passage signal obtained in the state in which the level sensor 10 is connected to the signal passage, by reference to the signal level of the passage signal obtained in the state in which the level sensor 10 is disconnected from the signal passage (s20 to s50 of FIG. 4).

A stray capacitance is present at the signal passage extending from the microcomputer 320 to the level sensor 10, irrespective of whether the level sensor 10 is connected thereto. In this case, the signal level of the passage signal determined in the state in which the level sensor 10 is connected to the signal passage (s30, s40 of FIG. 4) is influenced not only by the capacitance of each electrode pair of the level sensor 10, but also by the stray capacitance of the signal passage. Thus, the signal level of the passage signal determined in the state in which the level sensor 10 is disconnected from the signal passage (s20 of FIG. 4) reflects the stray capacitance of the signal passage.

Therefore, if the signal level obtained in the state in which the level sensor 10 is connected to the signal passage is corrected by the signal level of the passage signal obtained in the state in which the level sensor 10 is disconnected from the signal passage (s44 of FIG. 4), the corrected signal level is one in which the influence of the stray capacitance is suppressed.

The liquid level is determined from the signal level in which the influence of the stray capacitance is suppressed (s50 of FIG. 4), whereby the liquid level can be properly determined, while the influence of the stray capacitance is suppressed.

In the above-described embodiment, in s44 of FIG. 4, the signal levels of the passage signals determined in s30 and s40 of FIG. 4 are corrected by subtracting therefrom the signal level of the passage signal determined in s20 of FIG. 4.

As described above, the signal level determined in each processing is influenced by the capacitance of the signal passage. Therefore, the signal level of the passage signal determined in s30 of FIG. 4 is equal to the sum of the signal level of a signal having passed through the reference electrode 114 and the signal level of a signal having passed through the stray capacitance present at the signal passage. Similarly, the signal level of the passage signal determined in s40 of FIG. 4 is equal to the sum of the signal level of a signal having passed through the detection electrode 112 and the signal level of a signal having passed through the stray capacitance present at the signal passage. Meanwhile, the signal level of the passage signal determined in s20 of FIG. 4 is equal the signal level of a signal having passed through the stray capacitance present at the signal passage.

Therefore, through the above-described processing in which the signal level of the passage signal determined in s20 of FIG. 4 is subtracted from the signal levels of the passage signals determined in s30 and s40 of FIG. 4, the influence of the stray capacitance can be eliminated from the signal levels determined in s30 and s40.

In the above-described embodiment, in s50 of FIG. 4, the level of the liquid can be determined from the immersion ratio of the detection electrode 112 (the ratio of immersed portions of the paired electrodes thereof), which is determined from the signal levels of the passage signals determined in s20 to s40 of FIG. 4. Further, since the above-described embodiment is configured such that the latest signal level of the passage signal determined in s20 of FIG. 4 is subtracted from the latest signal levels of the passage signals determined in s30 and s40 of FIG. 4, even when a temperature change occurs around the liquid-level detection apparatus 1 (the detection circuit 20), the liquid level can be accurately determined, while the influence of the temperature characteristic of the detection circuit 20 can be mitigated.

(4) Modifications

The embodiment of the present invention has been described; however, the present invention is not limited to the embodiment, and various modifications are possible within the scope of the present invention.

For example, in the above-described embodiment, the environmental-state determination apparatus of the present invention is applied to an apparatus for detecting the level of oil stored in an oil tank. However, the environmental-state determination apparatus of the present invention can be applied to apparatuses, other than the apparatus for detecting the level of oil, which are adapted to determine the state of an environment surrounding a pair of electrodes.

For example, the state of the environment may be the degree of deterioration of a liquid such as oil. Specifically, when a pair of detection electrodes are disposed in a liquid, deterioration of the liquid causes a change in the capacitance between the pair of detection electrodes. Therefore, it is possible to detect the dielectric constant of the liquid from the capacitance, to thereby determine the degree of deterioration of the liquid.

Further, the environmental-state determination apparatus of the present invention may determine the humidity of a gas as an environmental parameter (environmental state). Specifically, when a pair of detection electrodes are disposed in a gas, a change in the moisture content of the gas causes a change in the capacitance between the pair of detection electrodes. Therefore, it is possible to determine the humidity of the gas, as an environmental parameter (environmental state), by making use of the capacitance.

In the above-described embodiment, signals to be supplied to the detection electrode 112 and the reference electrode 114 are generated by means of hardware; i.e., by instructions from the microcomputer 320 and the voltage-division circuit 332. However, these signals may be generated by means of software within the microcomputer 320.

In the above-described embodiment, in s50 of FIG. 4, the signal level of each passage signal is converted to a capacitance parameter, and the liquid level is determined from this capacitance parameter. However, parameters other than the signal level of each passage signal may be used as the capacitance parameter from which the liquid level is determined.

For example, a capacitance determined from the signal level of each passage signal may be used as the parameter. In this case, the apparatus of the embodiment may be modified such that after each of s240 of FIG. 5, s340 of FIG. 6, and s440 of FIG. 7, there is performed processing for determining the capacitance of the signal passage, the reference electrode 114, or the detection electrode 112 from the determined signal level of a corresponding passage signal, and the processing returns to the liquid-level detection processing, while setting the thus-determined capacitance as a return value.

Figure 6:
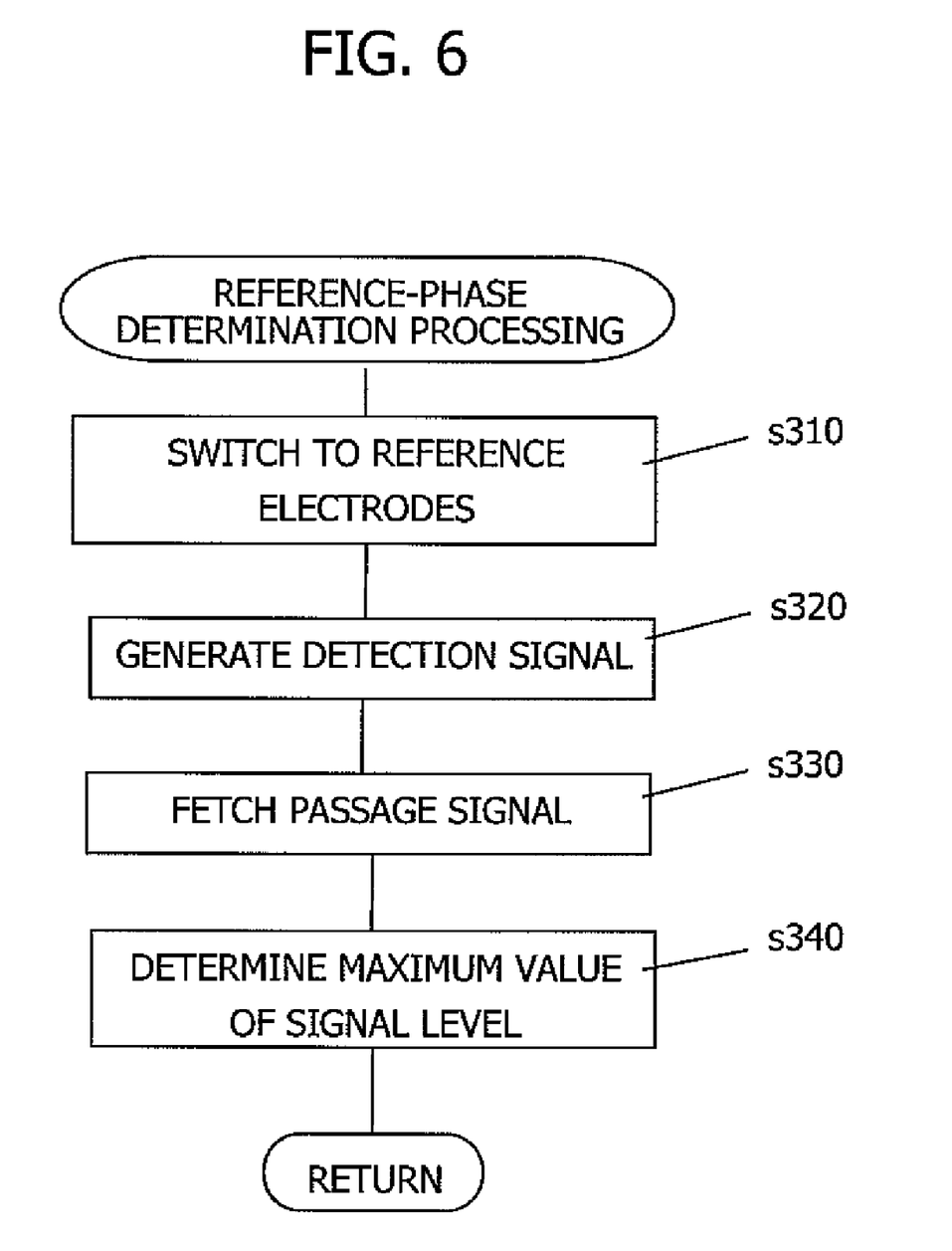
FIG. 6 is a flowchart showing reference-phase determination processing.
Figure 7:
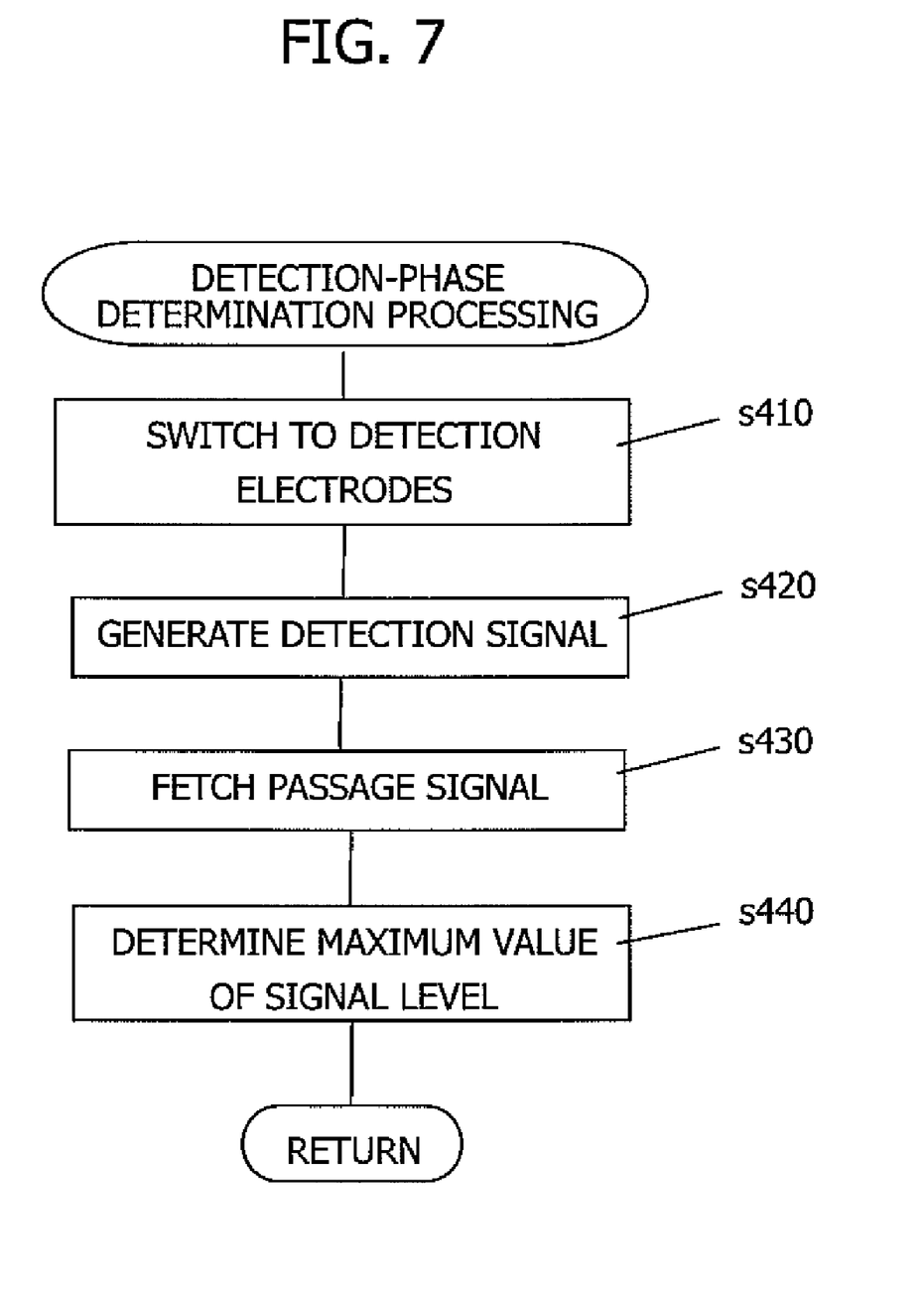
FIG. 7 is a flowchart showing detection-phase determination processing.

In this case, preferably, in s44 of FIG. 4, the capacitance determined in FIG. 5 is subtracted from the capacitances determined in FIGS. 6 and 7, respectively, and in s50 of FIG. 4, the liquid level is determined from the capacitances obtained through the subtraction.

At this time, the capacitances determined in s240 of FIG. 5, s340 of FIG. 6, and s440 of FIG. 7 assume values corresponding to the capacitances of the signal passage, the reference electrode 114, and the detection electrode 112, as described above. In this case, the capacitance determined in FIG. 5 becomes equal to the stray capacitance of the signal passage; the capacitance determined in FIG. 6 becomes equal to the sum of the capacitance of the reference electrode 114 and the stray capacitance of the signal passage; and the capacitance determined in FIG. 7 becomes equal to the sum of the capacitance of the detection electrode 112 and the stray capacitance of the signal passage.

Therefore, the influence of the stray capacitance on the capacitances determined in FIGS. 6 and 7 can be eliminated by subtracting therefrom the capacitance determined in FIG. 5.

In the above-described embodiment, in s60 of the liquid-level detection processing of FIG. 4, a PWM signal whose duty ratio corresponds to the liquid level determined in s50 is generated and output. However, the embodiment may be modified such that only data for generating a PWM signal whose duty ratio corresponds to the liquid level determined in s50 are set in s60, and a process for outputting the PWM signal is independently executed within the microcomputer 320 (CPU 321). In this case, the PWM signal is generated on the basis of the data set in s60, and output to the ECU 2 via the PWM output section 326.

(5) Relation Between the Components of the Embodiment and the Elements of the Invention In the above-described embodiment the liquid-level detection apparatus 1 corresponds to the environmental-state determination apparatus of the present invention. Further, the voltage-division circuit 332, the low-pass filter 334, and s420 of FIG. 7 correspond to the first input means of the invention; s440 of FIG. 7 corresponds to the first capacitance detection means; and s50 of FIG. 4 corresponds to the environment determination means.

Further, the connection changeover circuit 340, s210 of FIG. 5, s30 of FIG. 6, and s410 of FIG. 7 correspond to the disconnection means of the invention; the voltage-division circuit 332, the low-pass filter 334, and s220 of FIG. 5 correspond to the second input means of the invention; s240 of FIG. 5 corresponds to the second capacitance detection means; and s44 of FIG. 4 corresponds to the parameter correction means of the invention.

The invention claimed is:

1. An environmental-state determination apparatus comprising:
   a pair of detection electrodes which provide therebetween a capacitance which changes in accordance with a state of a surrounding environment;
   first input means for inputting a detection signal to a signal passage connected to the detection electrodes;
   first capacitance detection means for detecting a first capacitance parameter representing a capacitance of the detection electrodes on the basis of a signal output from the signal passage to which the detection signal is input by the first input means;
   disconnection means for disconnecting the detection electrodes from the signal passage;
   second input means for inputting the detection signal to the signal passage from which the detection electrodes are disconnected by the disconnection means;
   second capacitance detection means for detecting a second capacitance parameter representing a stray capacitance of the signal passage on the basis of a signal output from the signal passage to which the detection signal is input by the second input means;
   parameter correction means for correcting the first capacitance parameter detected by the first capacitance detection means by subtracting therefrom the second capacitance parameter detected by the second capacitance detection means; and
   environment determination means for determining the state of the surrounding environment on the basis of the first capacitance parameter corrected by the parameter correction means.

2. An environmental-state determination apparatus according to claim 1, wherein the pair of detection electrodes are plate-shaped electrodes which are disposed on a common plane such that a capacitance is produced between the electrodes in accordance with the state of the surrounding environment.

3. An environmental-state determination apparatus according to claim 1, wherein
   the disconnection means is configured to connect the detection electrodes to the signal passage and disconnect the detection electrodes from the signal passage in order to successively repeat the detection of the first capacitance parameter representing the capacitance of the detection electrodes by the first capacitance detection means and the detection of the second capacitance parameter representing the stray capacitance of the signal passage by the second capacitance detection means; and
   the parameter correction means performs the capacitance parameter correction by subtracting the latest second capacitance parameter detected by the second capacitance detection means from the latest first capacitance parameter detected by the first capacitance detection means.

4. An environmental-state determination apparatus according to claim 1, wherein
   the pair of detection electrodes are partially immersed in a liquid such that the level of a signal passing through the detection electrodes changes in accordance with the ratio of an immersed portion of the electrodes;
   the environment determination means detects the ratio of a portion of the detection electrodes immersed in the liquid from the first capacitance parameter corrected by the parameter correction means, and determines, as the state of the surrounding environment, the level of the liquid from the detected ratio.

* * * * *